(No Model.)
W. HOCHHAUSEN.
POLARITY PROTECTOR FOR DYNAMO ELECTRIC MACHINES.
No. 252,665. Patented Jan. 24, 1882.
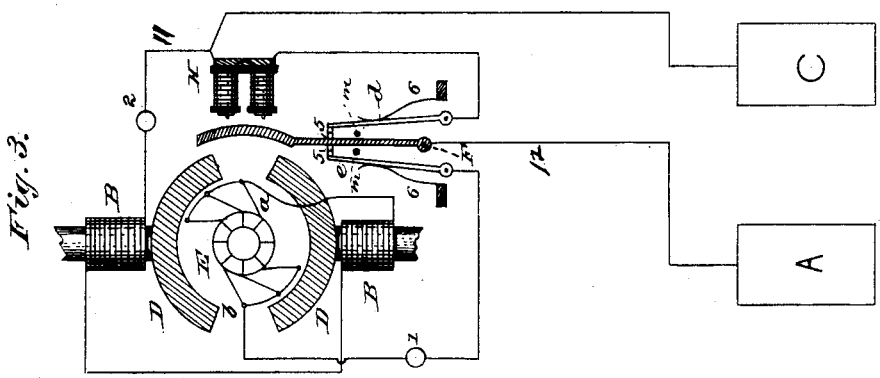
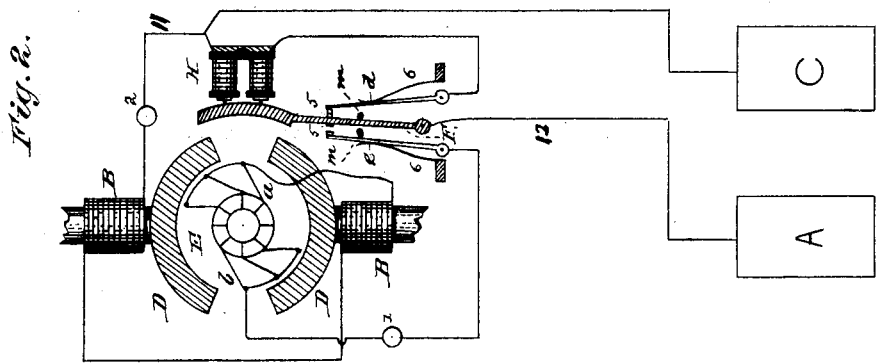
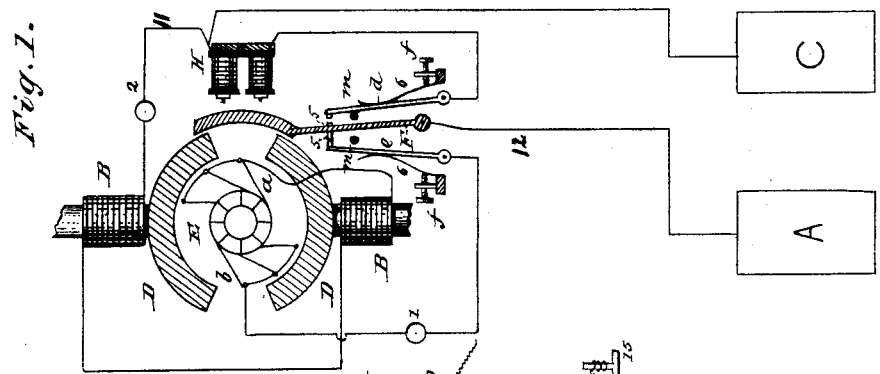
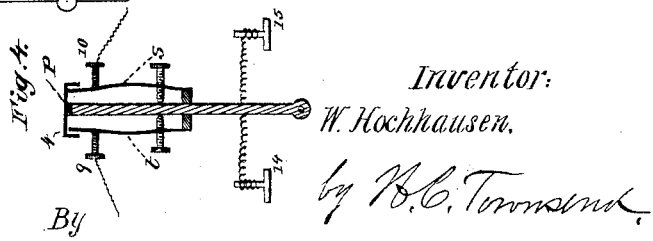
Witnesses:
Fred G. Dieterich
P. C. Dieterich
Inventor:
W. Hochhausen,
By R. C. Townsend,
Attorney.

UNITED STATES PATENT OFFICE.

WILLIAM HOCHHAUSEN, OF NEW YORK, N. Y.

POLARITY-PROTECTOR FOR DYNAMO-ELECTRIC MACHINES.

SPECIFICATION forming part of Letters Patent No. 252,665, dated January 24, 1882.

Application filed November 7, 1881. (No model.)

*To all whom it may concern:*

Be it known that I, WILLIAM HOCHHAUSEN, a citizen of the United States, residing at New York, in the county of New York and State of New York, have invented a new and useful Improvement in Polarity-Protectors for Dynamo-Electric Machines, of which the following is a specification.

The general object of my invention is to provide a means whereby the field-of-force magnets of dynamo-electric machines may be perfectly protected from reverse or counter currents, which would, if allowed to circulate in the coils of the field-magnets, reverse their polarity.

When dynamo-electric machines are used for electroplating it often occurs that the reverse or counter current from the electroplating-bath, caused by the polarization of its electrodes, will reverse the polarity of the field-of-force magnets, so that the current generated by the machine will be reversed, thus spoiling the work in the bath. The reversal of magnetism in the machine may also be produced by other causes—as, for instance, by atmospheric electric currents conveyed to the machine by the wires of the main circuit. Reversal of magnetism from the latter cause is particularly liable to occur when the leading and return wires are carried to great heights for the purpose of working electric lights upon towers or masts. Reversals of magnetism and of the generated current, whether occurring from the above or other causes, are at all times objectionable and result in derangements of the apparatus often attended with serious inconvenience. My invention is designed to afford a simple and perfect means for preventing such reversals, and one that shall be perfectly automatic in its action and suited to all the conditions of operation of the machine.

In carrying out my invention I employ an electro-magnetic switch actuated in opposite directions by the field-of-force magnet of the machine and by an electro-magnet in a branch or safety circuit for the reverse current, and provided with contact-points and circuit-connections so arranged that when the machine is running the switch is held in proper position by the attraction of the field of-force magnet (or a magnet in the main circuit) to allow the generated current to pass to the work; but when said switch is retracted, owing to a weakening of the magnetic field of the machine, a branch or safety circuit is closed by the switch for the reverse or counter current, and the switch is held in the latter position by an electro-magnet in the safety-circuit until the counter or reverse current is wholly expended. When this has occurred a spring throws the switch back to a position where it may be attracted by the field-of-force or the main-circuit magnet, so that the branch or safety circuit will be broken and the general circuits restored to an operative or normal condition. As a further provision to insure the field-of-force magnets from reversal of polarity by a counter-current, I cause the switch, when retracted from the field-of-force magnet or the magnet in the general circuit, to break the main or general circuit coming from the machine, thus making it impossible for the counter current to reach the field-magnets. In order that the machine, when the circuit to the same is restored, may rapidly accumulate energy, I so arrange the contacts that when the switch is in a position of rest a short circuit is formed for the currents from the machine. When the machine has accumulated considerable energy the attraction of the field-magnet causes the switch to break the short circuit and throw the generated currents into the general circuit.

In the accompanying drawings, Figure 1 shows the principal parts of a dynamo-electric machine with one arrangement of circuit-connections, switch-stops, &c., that may be employed for carrying out my invention. The switch is here shown in the position it assumes when the machine is running. Fig. 2 shows the switch in position for diverting a counter or reversing current. Fig. 3 shows the position assumed by the switch when the machine is at rest or the counter-current has been discharged. Fig. 4 shows a modified construction of switch-contacts that may be employed in place of those shown in the other figures.

Referring to Figs. 1, 2, and 3, B B represent the field-of-force magnets, and D D their curved pole-pieces, in a dynamo-electric machine of any ordinary construction, while E represents the end of the commutator-cylinder fixed to the armature-shaft of the machine.

*a* and *b* represent the commutator brushes or collectors applied to the commutator-cylinder, and serving to collect the current generated in the armature helices or bobbins by the revolution of the armature between the poles of the field-of-force magnets. Commutator-brush $b$ connects directly with the main binding-post 1 of the machine, while brush $a$ is connected, as shown, to the helices of one of the field-of-force magnets B, from which a connection is taken through the other field-of-force magnet to the main binding-post of the machine at 2. These circuits and connections are well understood in the art, and are in principle the same as those belonging to all machines of the class that operate on the principle of mutual accumulation.

F is a pivoted armature-lever, which constitutes the operating portion of the switch, and is provided at its upper end with an armature of any desired form, placed within the attractive influence of the field-of-force magnets on one side and of an electro-magnet, H, placed in the safety or branch circuit on the other. Pivoted yielding contact-levers $d$ $e$, placed on either side of the switch-lever, are pressed toward the switch-lever by springs 6 6, and are adapted to make contact, either singly or together, with the switch lever at the contacting points 5 5. Adjusting-screws $f f$ serve to adjust the tension of the springs 6 6, while stops $m$ $m$, of any desired construction, limit the movement of the parts. These are mounted upon a suitable frame or support of any desired form in the relative positions shown. Contact-lever $e$ is connected with main post 1 of the machine, and lever $d$ is connected through an electro-magnet, H, of preferably low resistance, with the main circuit-wire 11, leading from the other principal binding post, 2. The latter circuit from $d$ to 11 constitutes the branch or safety circuit, which is provided for counter or reverse currents. It also, in the arrangement of circuits here shown, is a portion of the short circuit through which the currents from the machine circulate when the machine is started.

The operating switch-lever F is connected with the main or leading wire 12, which conveys the current to the plating-bath, lamp, or other work.

I have here represented the machine as connected to a plating-bath, because it is here peculiarly useful, although its usefulness is by no means limited to such applications of the machine.

A and C are supposed to represent respectively the anode and cathode of an electroplating-bath.

The general operation of the switch is as follows: When the machine is at rest the parts are in the position shown in Fig. 3, the contact-lever being held in central position between the magnet H and the poles of the field-of-force magnets by means of the yielding spring-actuated contact-levers $e$ and $d$, both of which bear against the lever F, the springs 6 6 being adjusted to approximately the same tension for this purpose. When the armature begins to turn the current generated passes from post 1 directly through the contact-stop devices $e$ $d$ and the lever F, to and through electro-magnet H, and to binding-post 2 of the machine. This circuit is virtually a short circuit for the generated current, so that practically no current passes to the outside or general circuit. Under these conditions the machine rapidly accumulates magnetism, and the current generated rapidly increases in strength until finally the attraction of the field of-force magnet overcomes the tension of the spring 6 and the opposing force of electro-magnet H, so that the switch is drawn into position shown in Fig. 1, the contact $d$ yielding under the movement of the lever forward. By this movement the short circuit is broken, since the contact $d$ is unable to follow the switch, being prevented from so doing by the right-hand stop $m$. When the switch is in the latter position the current from the machine circulates from post 1 through contact $e$, switch-lever F, and through the main-line wire 12 to the anode of the bath, through the bath to the cathode and main wire 11, to the other post, 2, of the machine. If, while the machine is running, a counter-current is set up from the bath to such an extent as to materially weaken the strength of the field-magnet and to threaten a reversal of its polarity, the switch is thrown back to the position shown in Fig. 3 by the action of the spring 6 acting upon contact $e$, in which position a short circuit is provided for the counter-current through wire 12, contact $d$, electro-magnet H, and wire 11. The effect of this is to energize magnet H and immediately cause the switch to assume the position shown in Fig. 2, the contact $d$ yielding to allow this movement. In this position of the switch the main circuit from the machine is broken at contact $e$, which is unable to follow the switch, being prevented from so doing by the stop $m$. A free path is thus provided for the counter-current, while all danger of the counter-current reaching the machine is prevented by the breaking of circuit at $d$ 5. The switch remains in the position shown in Fig. 2 (being held by the counter or reverse current circulating through H) until such current has been expended, when the magnet loses its strength, and spring 6 is allowed to act and return the switch-lever to a central position, where a short circuit for the machine is provided, as before described. If the machine be still running, the switch is immediately thrown into the position shown in Fig. 1, provided the field-magnets be of sufficient strength for the production of a proper current. If the field-magnets be too weak, the short circuit allows of the accumulation of energy until finally the magnet becomes of sufficient strength to pull the switch over. When the machine is stopped the counter-current which flows from the bath is prevented from circulating in the field-magnets in precisely the same manner as under the conditions already supposed. When the counter-current has expended itself the switch assumes the position shown in Fig. 3, with the short circuit closed, and the machine is ready at any time to resume its operation.

It is obvious that the switch operates in the same manner to protect the machine from the effects of currents that would tend to depolarize it or reverse its magnetism, from whatever cause such currents arise.

In the modified construction of the switch-lever shown in Fig. 4 the yielding contacts are placed upon the lever itself.

9 and 10 represent contact-stops connected respectively with one post of the machine, and with the short-circuit wire leading to the main wire connected to the other post.

$s$ and $t$ represent two springs mounted upon and electrically connected with the lever, and adapted to make contact separately or at the same time with the stops 9 and 10.

P represents a double hook, insulated from the lever and extending over the ends of the springs.

14 and 15 represent centering-springs applied to the lever itself, and tending to hold it in a central position corresponding to that shown in Fig. 3. When the lever is in this position there is a circuit from 9 to 10 through spring $t$, lever, and spring $s$. When the lever is swung to the left, or into a position corresponding to that shown in Fig. 1, the contact of spring $t$ with stop 9 is preserved, the spring yielding to allow of the movement, and at the same time contact with stop 10 is broken, the spring $s$ being prevented from remaining in contact therewith as the lever moves to the left, by the hook P. When the lever swings to the right contact with stop 9 is broken, and spring $s$ yields as the lever moves into position.

The springs $s$ $t$ may be relied upon alone to hold the lever in the central position and to restore it to that position, or the springs 15 and 16 may be used in addition for that purpose.

I do not limit myself to any particular construction of the switch and its yielding contact-stops, nor to any particular manner of applying the devices for restoring it to a central or intermediate position. It is also to be understood that the short circuit provided for the machine when the switch is in an intermediate position may be closed by other contacts and connections besides those through which the circuits closed in the extreme opposite positions of the switch are completed.

As I have before intimated, the switch may be held in the position which belongs to it when the machine is running by an extra or supplemental magnet placed in proper position to be always connected to the machine, instead of by the poles of the field-of-force magnets.

What I claim as my invention is—

1. The combination, with a dynamo-electric machine, of an electro-magnetic switch the armature of which is placed within the attractive influence of the field-of-force magnets of the machine, contact stops or points with which said switch is adapted to make contact in its two opposite positions, said stops being connected, one with the machine and the other with a safety or branch circuit, and an electro-magnet in said branch circuit, all combined as described, so that in one position of the switch the safety-circuit is broken and in the other position the safety-circuit is closed and held closed by the magnet in said circuit, the main or principal circuit from the machine being simultaneously broken.

2. The combination, with a dynamo-electric machine, of an electro-magnetic switch actuated in opposite directions in the manner described, contact-stops with which said switch makes connection in its two extreme positions and in its intermediate positions, and circuit-connections to the machine, to the main circuit, and to a safety or branch circuit, all combined as set forth, so that when the switch is in one extreme position the main circuit is closed and the branch circuit broken, when in the other extreme position the branch circuit is closed and the main circuit from the machine broken, and when in an intermediate position a short circuit for the machine is provided.

3. The combination, with a dynamo-electric machine, of a polarity-preserving switch provided with yielding contact devices adapted to close the main or principal circuit to the machine when the switch-lever is in an extreme position under the influence of the field-magnet pole, and to preserve the contact and connection to the machine when the switch-lever is in an intermediate or central position, as described.

4. The combination, with a dynamo-electric machine, of an electro-magnetic switch, centering devices for restoring said switch to an intermediate or central position after having been thrown to one extreme position or the other, and circuit-connections, as described, adapted to furnish a short circuit for the currents generated by the machine when the switch is in such central or intermediate position.

5. The combination, with a dynamo-electric machine, of an electro-magnetic switch adapted to hold the circuit from the machine to the main or principal circuit closed when the machine is running, mechanical retracting devices for said switch, and a contact-stop and connections to a safety or branch circuit containing an electro-magnet, said stop being adapted to close the circuit to the branch when the switch is retracted by the mechanical devices.

6. The combination, with a polarity-preserving switch adapted to assume two extreme positions and an intermediate or central position, of yielding contact devices for said switch, both of which are closed when the switch is in an intermediate position, and stops, as described, to prevent the yielding contacts from preserving contact when the switch is thrown to one side or the other of its central position.

7. The combination, with a dynamo-electric machine, of a polarity-preserving switch, an electro-magnet in a branch or safety circuit for holding the branch or safety circuit closed, and following contacts for the branch circuit adapted to preserve the connection for the branch when the magnet releases its hold upon the switch, substantially as and for the purpose described.

8. The combination, with a dynamo-electric machine, of a safety switch-lever, centering devices for holding said switch-lever in a central or intermediate position, yielding and following contact devices closed when the switch is in its central position and adapted to preserve contact when the lever is drawn to one side, an electro-magnet constantly in the circuit of the machine for carrying the switch in one direction, circuit-connections, as described, to the machine, the line, and a branch circuit, and an electro-magnet in said branch circuit for carrying the switch in the other direction.

9. The combination, with a dynamo-electric machine, of an electro-magnetic switch, an electro-magnet constantly in the main-circuit connection from the machine for holding the switch in one extreme position, an electro-magnet in a branch or safety circuit for holding the switch in another extreme position, centering and retracting devices for holding the switch in an intermediate position or restoring it to such position when released from the influence of its actuating-magnets, and circuit-closing devices operated by the switch for closing the safety-circuit and machine-circuit when the switch is in its extreme positions, and for closing a short circuit for the machine when the switch is in an intermediate position.

10. The combination, with a dynamo-electric machine, of an electro-magnetic switch, an electro-magnet constantly in the machine-circuit for actuating the switch in one direction, an electro-magnet in a branch or safety circuit for holding the switch retracted, and circuit-connections, as described, to the machine, the line, and the safety-circuit, whereby the circuit from the machine to the line is closed in one position of the switch, while in the other position of the switch the latter connection is broken and a connection between the line and the safety or short circuit around the machine is substituted.

WILLIAM HOCHHAUSEN.

Witnesses:
H. C. TOWNSEND,
FRED. G. DIETERICH.